Aug. 25, 1942. H. A. KLAHRE 2,294,305
APPARATUS FOR MAKING TASSEL FRINGE
Filed May 20, 1939 6 Sheets-Sheet 6
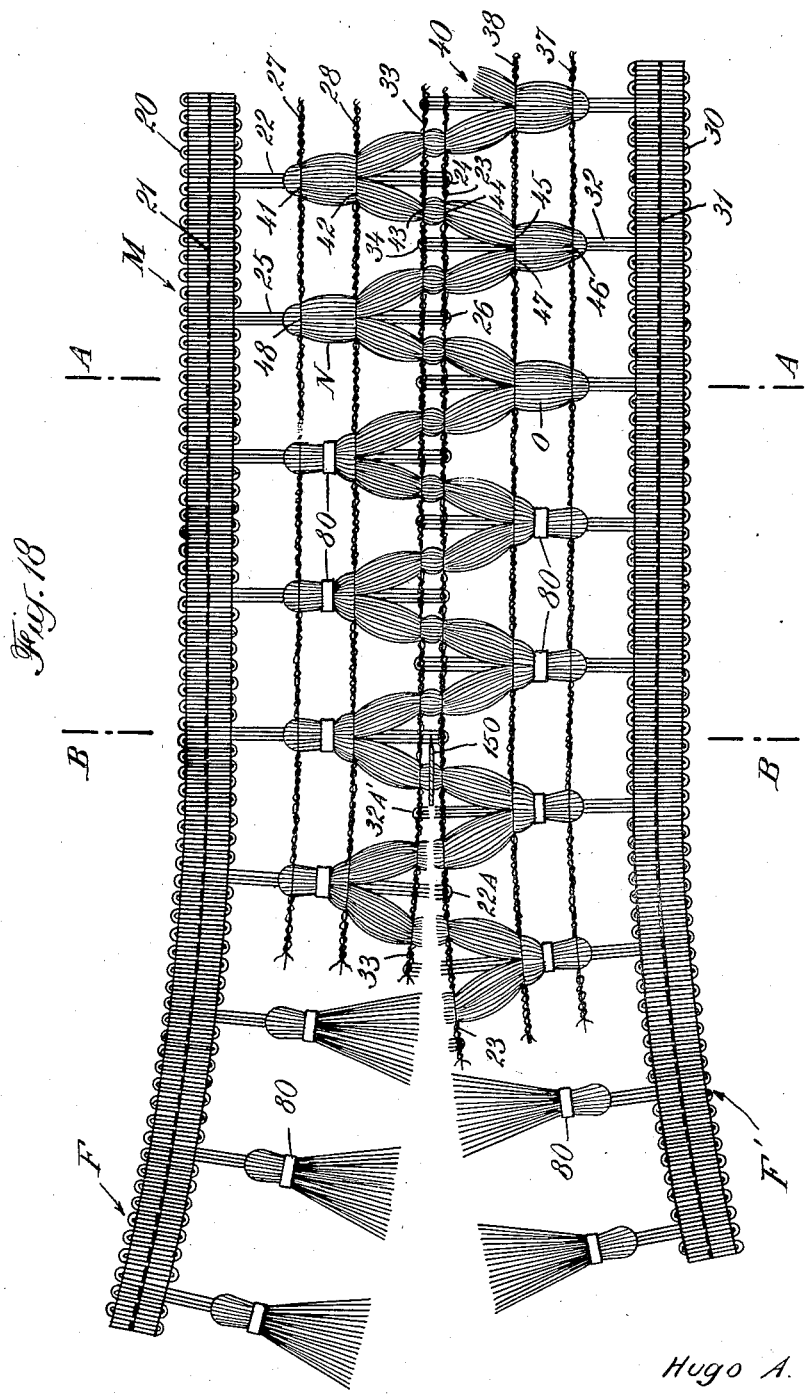
INVENTOR
Hugo A. Klahre
BY
Marshall & Hawley
ATTORNEYS Patented Aug. 25, 1942

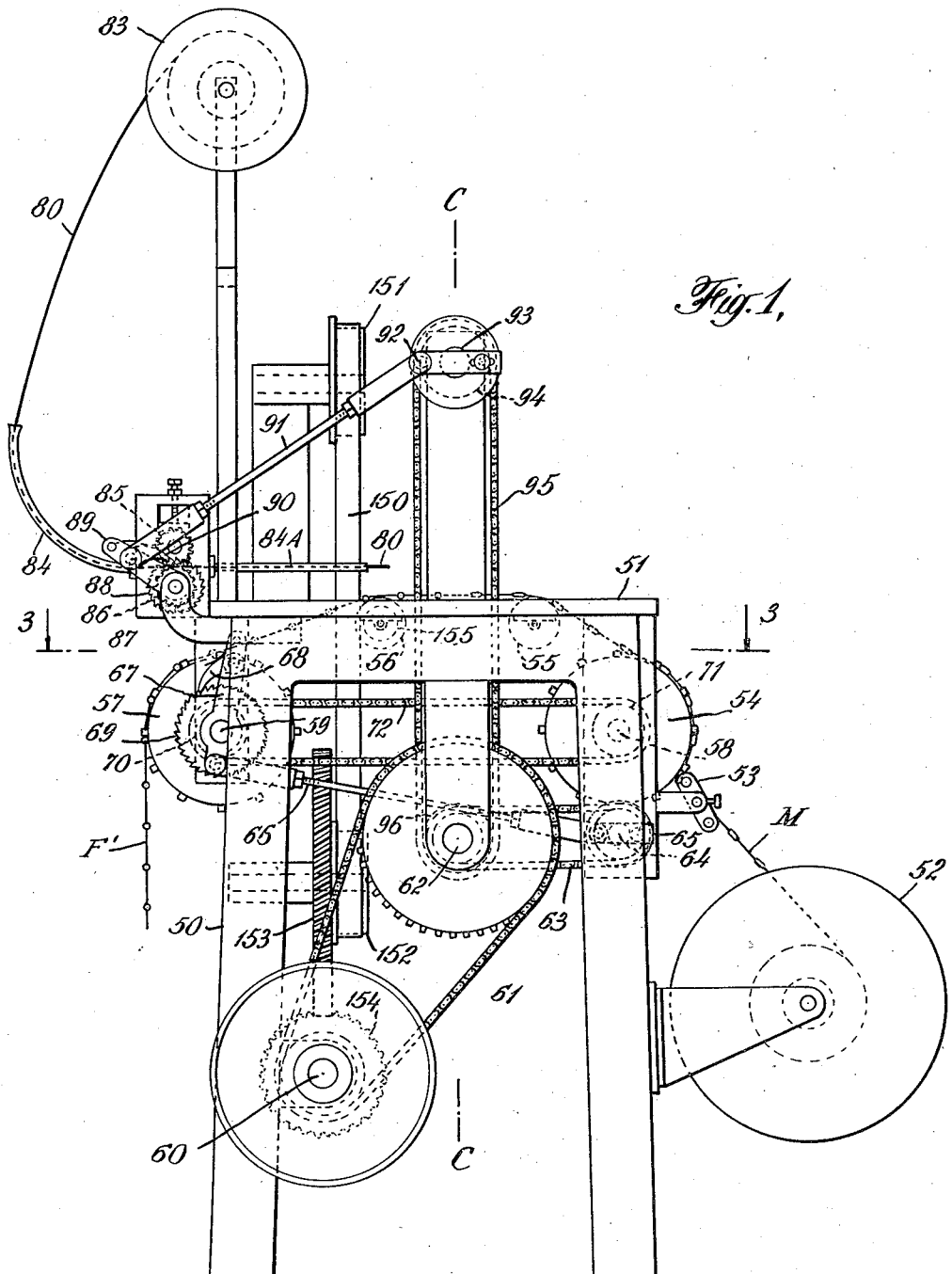

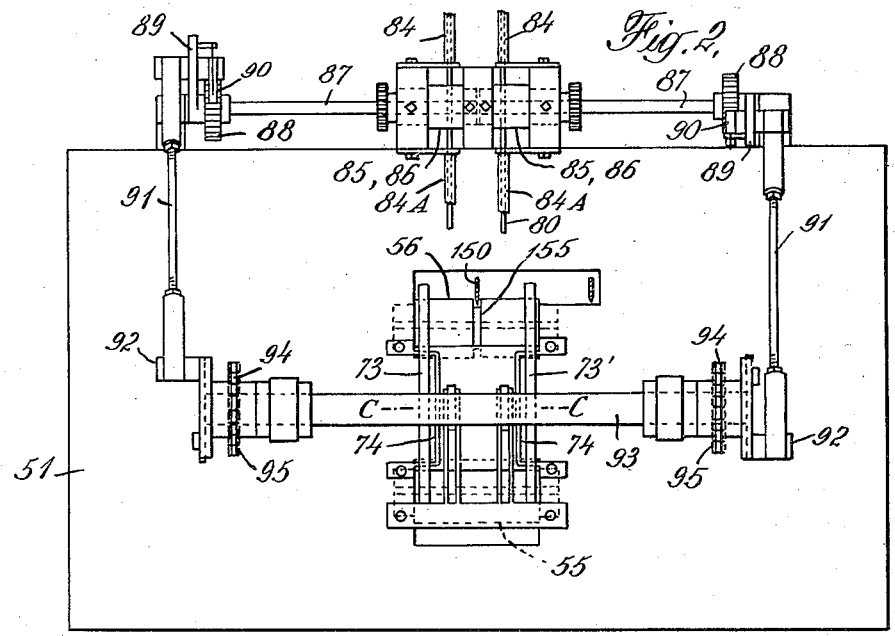

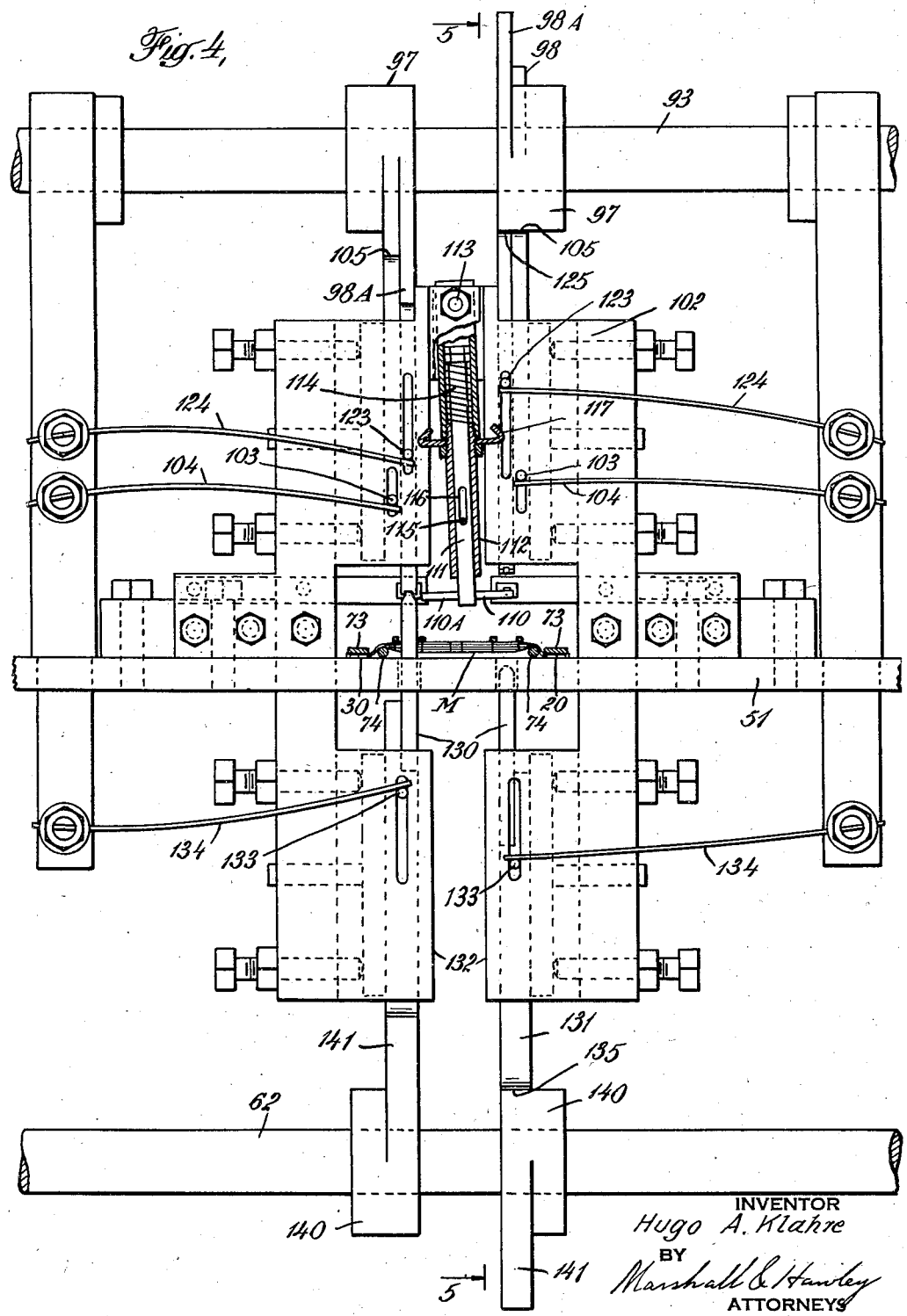

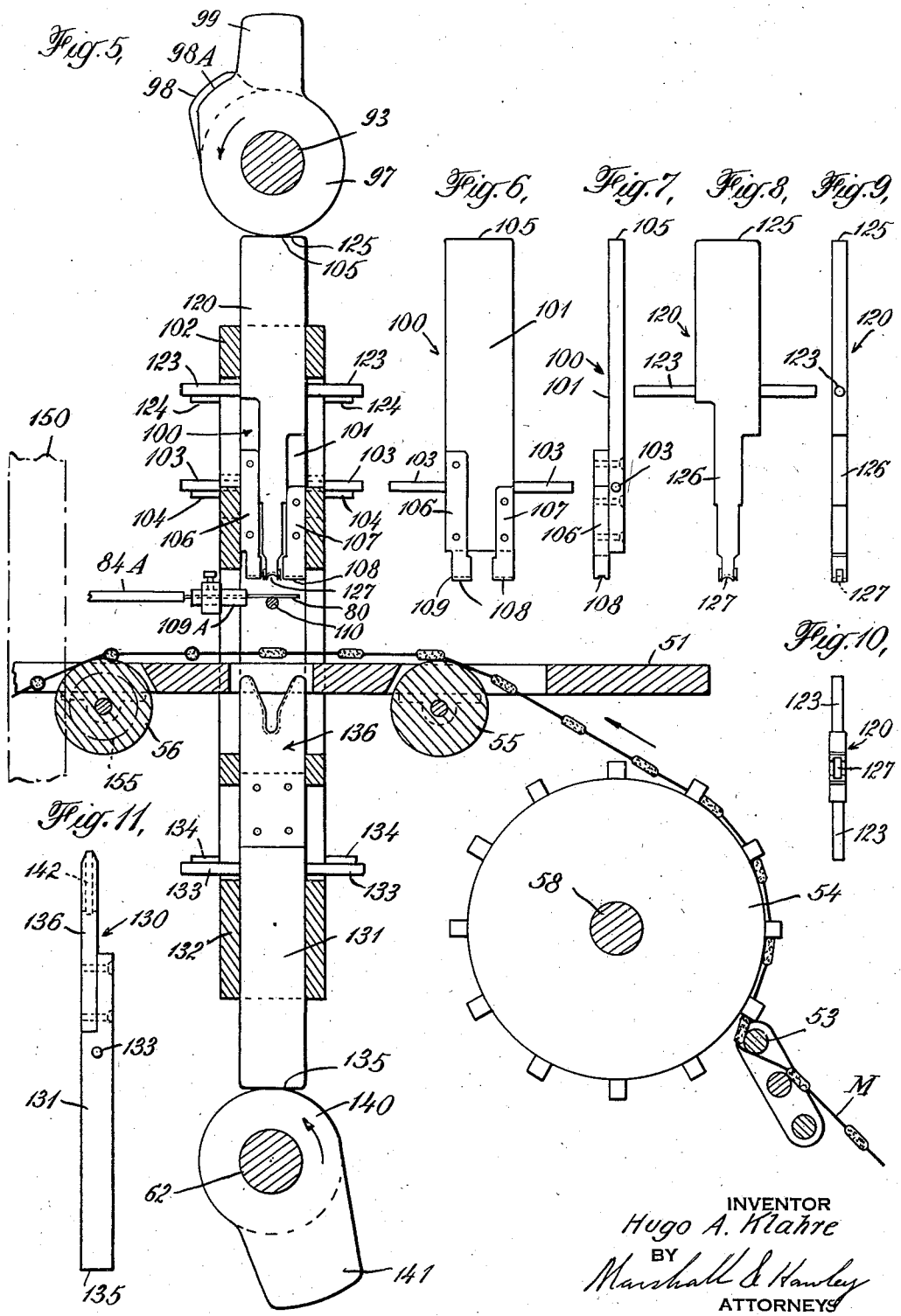

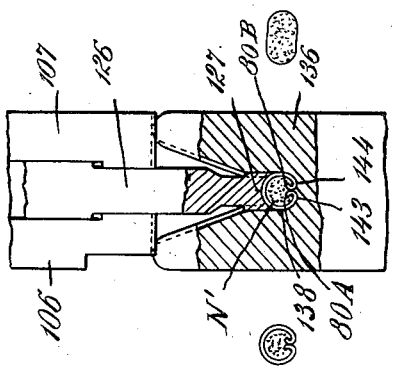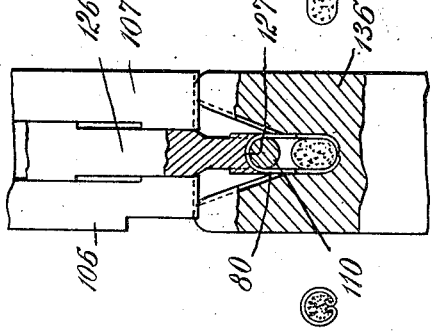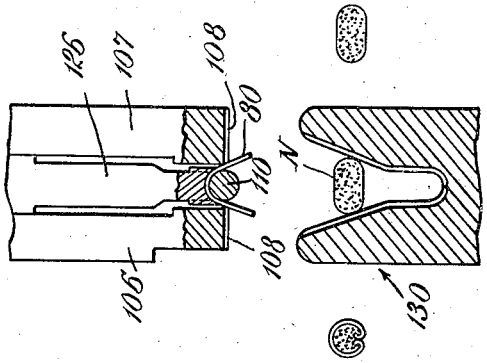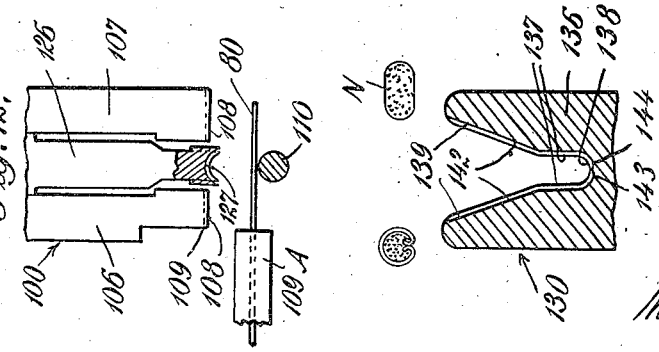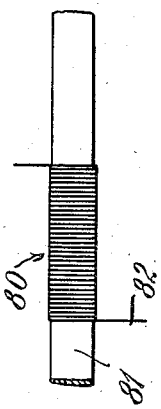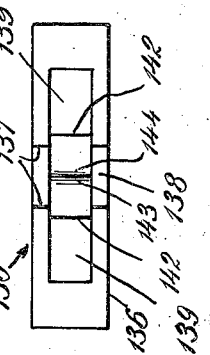

2,294,305

UNITED STATES PATENT OFFICE 2,294,305

APPARATUS FOR MAKING TASSEL FRINGE

Hugo A. Klahre, Teaneck, N. J., assignor to Consolidated Trimming Corporation, New York, N. Y., a corporation of New York Application May 20, 1939, Serial No. 274,710

4 Claims. (Cl. 28—2)

This invention relates to improvements in apparatus for making tassel fringe.

Its object is to provide means and ways of producing such material rapidly and inexpensively.

Another object is to eliminate the waste attendant upon the manufacture of tassel fringe by such machines and methods as have been available heretofore.

These and other objects of the invention will appear in the following specification in which I will describe a machine which embodies my invention, the novel features of which will be set forth in appended claims.

Referring to the drawings,

Fig. 1 is a side elevation of a machine which is made according to and embodies my invention;

Fig. 2 is a plan view of the machine with some of its parts omitted;

Fig. 3 is a sectional plan view of the same machine, the section being taken on the line 3—3 of Fig. 1;

Fig. 4 is a front elevation of the machine shown in the preceding figures, with some of its parts shown in section;

Fig. 5 is a sectional side elevation on a larger scale of some of the parts of the machine. The section in this figure is taken on the line 5—5 of Fig. 4;

Fig. 6 is a side elevation and Fig. 7 an end view of a binder, cutter and guide;

Figs. 8, 9 and 10 are, respectively, a side elevation, an end view and a bottom plan view of a plunger die;

Fig. 11 is a side elevation of a lower forked die;

Figs. 12, 13, 14 and 15 are similar side elevations of the binder, cutter and guide, the plunger die and the lower forked die being shown in different relative positions to illustrate the operation of these parts;

Fig. 16 is a plan view of the lower forked die;

Fig. 17 is a plan view of or part of the binder with a superposed cross section of its core; and Fig. 18 is a plan view of a novel material made with the machine hereindescribed. This material is shown to the right of the line A—A as a knitted structure especially designed to be made into tassel fringe. Between lines A—A and B—B it has been modified by the addition of binders to certain of its parts and to the left of line B—B the modified material has been severed into strips of tassel fringe.

Before specifically describing the parts and operation of the machine, I will describe the part of the tassel fringe making material which is shown to the right of the line A—A in Fig. 18, which is generally designated by the reference letter M. This comprises two spaced tape-like edges 20 and 30 into which may be woven threads 21, 31 of a different color, if desired, for the purpose of ornamentation.

One or more strands 22 of the material which forms the tape 20 extend at right angles from the inner edge of the tape, are looped around longitudinal strands of thread 23, as at 24, and back to the edge of tape 20. Spaced from the strand or strands 22 are other strands 25 similarly looped around the strand or strands 23, as at 26.

From the inner edge of the other tape 30 one or more strands 32 extend at right angles midway between the strands 22 and 25, are looped around longitudinal strands 33, as at 34, and then run back to the tape 30.

A warp rope 40 of a plurality of parallel strands of yarn or the like, extends back and forth intermediate the tapes 20 and 30 in the manner shown. At a point 41, in transverse alinement with the strands 22 and spaced from the tape 20, this warp rope is doubled upon itself. Longitudinal threads 27 run through the loop thus formed, between the strands 22 and around the outside of the doubled warp strand to tie these parts together closely. In the same transverse line, but spaced inwardly from the longitudinal strands 27, are longitudinal strands 28 which tie one group of warp yarn to one of the strands 22 and the adjacent group of warp yarn to the other strand 22 and hold these two groups together, as at 42, in such a position that they abut in a line between the strands 22.

From this point one of the groups of warp yarn extends diagonally away from the strands 22 to the longitudinal strands 33 which tie the group together, as at 43. Thence, this group of warp yarn extends at right angles to the tapes to the longitudinal strands 23 which tie the group together, as at 44.

This group of warp yarn then extends diagonally to longitudinal strands 38 which tie it and one of the strands 32 together, as at 45. The group then passes around longitudinal strands 37, around which it is looped and tied together with the strands 32, as at 46. Thence it runs back to the longitudinal strands 38 which tie it and the other strand 32 together, as at 47. The ties at 45 and 47 are symmetrically disposed in relation to the transverse strands 32. The warp rope extends diagonally to the longitudinal strands 23, transversely to the longitudinal strands 33, diagonally to the longitudinal strands 28 and then up to and around the longitudinal strands 25 which tie it and the strands 25 together at 48, in the manner described. This construction is continued to form a tassel fringe making material M of indefinite length. This material is made on a knitting machine of known construction, but the material is new.

By means of an apparatus which will be described hereinafter, binders 80 are clamped around the parts of the warp rope between the longitudinal strands 27, 28 and between the longitudinal strands 37, 38. The material will then be in the condition in which it is illustrated in Fig. 18 between the lines A—A and B—B.

On the line B—B the material is severed longitudinally by a cutter 150 between the longitudinal strands 23 and 33. When the longitudinal strands are removed, two rows of tassel fringe F and F' will result, as shown to the left of line B—B in Fig. 18. The inner parts of the strands 22, 25 will be embedded in and form parts of the tufts of the tassels formed on tape 20 and the inner ends of strands 32 will be in the tufts of the tassels formed on tape 30. The only material lost in making this tassel fringe is the longitudinal strands, for which waste material may be used, and the small loops 22A and 32A which run over the longitudinal strands 23 and 33, respectively.

The apparatus for applying the binders to the material M and severing it longitudinally, comprises a frame 50 which supports a table 51 and the other parts of the mechanism. 52 is a reel on which the material M is wound. The material is passed under a guide rod and tension device 53 to a double sprocket 54, over rollers 55, 56 and the severed material passed over a double sprocket 57. The teeth of the double sprockets engage the parts of the material M which is between the longitudinal strands 27, 28 and 37, 38. The sprockets 54 are mounted on a shaft 58 and the sprockets 57 are mounted on a shaft 59.

60 is a drive shaft which is connected by a chain 61 and suitable sprockets to rotate an intermediate shaft 62. 63 is a chain which connects shaft 62 to drive a countershaft 64. Crank arms 65 near the ends of countershaft 64 impart a reciprocating movement to connecting rods 66, the corresponding ends of which are connected to the crank arms and their other ends are connected to rock levers 67 which are loosely mounted on the end of shaft 59. Pawls 68 on these rock levers engage ratchet gears 69 affixed to shaft 59. By this mechanism a step by step rotation is imparted to the sprockets 57. This step by step rotation is transmitted to shaft 58 and sprockets 54 by sprockets 70 on shaft 59, sprockets 71 on shaft 58 and interconnecting chains 72.

The parts of the driving mechanism thus described are so proportioned and arranged that they bring the part of material M which is in transverse alinement with its strands 22 up to the line C—C of Fig. 1, then the part of the material which is in alinement with its strands 32 up to the line C—C, then the part which is in alinement with strands 25 up to the line C—C, et seq.

As the material M is moved along, its tape edges 20 and 30 are drawn down to the table by resilient guide strips 73. Its parts adjacent its tape edges are raised slightly above the table by passing over rods 74. The material is under longitudinal tension between the double sprockets 54, 57 and this arrangement keeps it under lateral tension.

The binder material 80, as shown in detail in Fig. 17, comprises a flat wire 81 covered with a thread 82. A supply of this binder material is wound on two-spaced reels on a common axis. A side elevation of these reels is shown in Fig. 1 and portions of the binding material are shown in Fig. 2, to illustrate their spaced relation. Each of these strips of binding material passes through a curved guide 84 and between a pair of feed rollers 85, 86 which are geared together and through a horizontal straight guide 84A. The rollers 86 are affixed to alined shafts 87 to which are affixed ratchet gears 88. Rocker arms 89 are pivotally mounted on the shafts 87. They carry pawls 90 which engage the ratchet gears 88. 91 are connecting rods between these rocker arms and crank pins 92 on opposite ends of an upper shaft 93. Sprocket gears 94 on shaft 93 are connected by chains 95 with similar sprocket gears 96 on the intermediate shaft 62 to drive the upper shaft 93. The crank pins 92 are angularly spaced 90° apart so that when one of the pawls 90 moves forwardly the other moves in the opposite direction so that the strips 80 are alternately fed forwardly.

When one of the strips 80 moves forwardly it emerges from its guide 84A into the path of a reciprocating binder, cutter and guide 100 which has a flat body portion 101 vertically slidable in a stationary frame 102, (Figs. 5, 6 and 7).

Pins 103 project laterally from the sides of the body 101 of this cutter and guide and are engaged by springs 104 which raise it so that its upper end 105 engages a cylindrical portion of a cam 97 affixed to the upper shaft 93. Side pieces 106, 107 are affixed to the body 101 on its lower portion. The ends of these side pieces are grooved transversely, as at 108.

An eccentric part 98 of cam 97 forces the cutter and holder downwardly. As its side pieces reach the binder 80, an edge 109 of side piece 106 passes over a shear block 109A through which the binder projects and severs the binder at this point.

The severed end of the binder at this time rests upon an anvil 110 and in the grooves 108 of the side pieces 106 and 107. The anvil, as shown in Fig. 4, projects laterally from a plunger 111 which is telescopically guided in a laterally movable swinging frame 112, pivotally supported at 113. A spring 114 forces the plunger upwardly in the frame 112. Its upward movement is limited by a pin 115 in the frame which passes through a slot 116 in the plunger.

120 is an upper die which lies against the body 101 of the cutter and guide and slides independently in the stationary frame 102. Pins 123 which project from its sides are engaged by springs 124 which raise it so that its upper end 125 rests against the cylindrical part of the cam 97. The lower part 126 of this upper die is narrow and slides between the side pieces 106 and 107. Its lower end 127 is rounded to conform to the anvil 110. An eccentric part 98A of cam 97 engages the top 125 of this upper die and imparts to it a downward movement slightly behind that of the cutter and holder 100, so that its end 127 engages the binder 80 at the time it is severed and holds it against the anvil 110.

From that point the cutter and holder 100 and the upper die 120 move downwardly together to the positions in which they are shown in Fig. 13.

At this time the end 127 of the upper die holds the center of the severed part of the binder 80 firmly against the anvil 110 and the side pieces 106, 107 bend it into the shape of a flaring staple, as is shown in Fig. 13.

During this part of the operation, a lower forked die 130 is moving upwardly. The lower die comprises a body portion 131 which slides in vertical stationary guides 132. Pins 133 which project laterally from it are engaged by springs 134 which force it downwardly to bring its end 135 into engagement with the cylindrical part of a cam 140 affixed to the intermediate shaft 62. The lower cam is raised by an eccentric part 141 of cam 140.

136 is the forked part of the lower cam. It is affixed to the body portion 131 and is constructed to form a pocket having parallel walls 137 joined at their lower ends by a semi-circular portion 138. Inclined walls 139 converge into the parallel wall 137. Central grooves 142 of sufficient width to receive the binder 80 are cut in the walls 139 and 137. These grooves terminate at the center of the semi-circular portion 138 where they curve upward, as shown at 143, 144 into the surface which forms the semi-circular portion. (See Figs. 12 and 16.)

As the lower die moves upwardly, its forked part 136 embraces that part of the material M which is in its path, such as one of the portions designated by N in Figs. 13 and 18. This is a part of the material between the longitudinal strands 27, 28 and in symmetrical alinement with certain of the transverse strands, such as those designated by 25. The relative position of the parts as thus described is shown in Fig. 13.

The lower die finally moves up to the position in which it is shown in Figs. 14 and 15. During its final movement the upper die 126 moves to its Fig. 14 position, carrying with it the anvil 110, moved against the action of its spring 114, with the severed portion of the binder between its end 127 and the anvil. The ends of the binder enter the groove 142 and are brought into parallelism by the plane of the walls 139.

When the upper die reaches this Fig. 14 position the end of its spring 124 contacts a beveled cam 117 on the swinging frame 112 (Fig. 4) to force the frame over to the other side of the vertical and to pull the anvil 110 out of the binder.

The groove 142 has sufficient depth to permit the binder to pass outside of the portion N of the material M as the upper die continues to move downwardly to its Fig. 15 position. During this, its final downward movement, two functions are performed,—the portion N is squeezed together between the end 127 of the upper die and the semi-circular part 138 of the lower die into the condition in which it is shown at N' in Fig. 15, and the ends of the binder are bent upwardly and outwardly into the warp material by the curved portions 143, 144 of the slot, as shown at 80A and 80B. Thus, the binder not only encircles the compressed warp strands and retains them in this condition, but the ends of the binder are embedded in the warp strands so that its covering thread 82 cannot unwind. After this operation the cutter and holder 100, the upper die 120 and the lower die 130 are returned to their initial positions by their respective springs.

At the time of this return movement of the parts mentioned, the material M is advanced a step to bring a portion of it, designated by O in Fig. 18, into alinement with another cutter and holder, upper die and lower die. The anvil 110A is then in position to cooperate with the latter mentioned parts and the operation is repeated making the material in the condition in which it is shown between the lines A—A and B—B in Fig. 18.

150 is an endless band cutter supported on an upper pulley 151 and a lower pulley 152, (Figs. 1 and 3). The latter is driven by a gear 153 in mesh with a gear 154 on the drive shaft 60. The roller 56 is grooved, as at 155 (Fig. 2), to receive the cutter 150. As the material M advances it is severed, as shown on the line B—B of Fig. 18, and after the longitudinal strands are removed, two pieces of tassel fringe F and F" (Fig. 18) are completed.

Various modifications may be made within the spirit and scope of this invention and I intend no limitations other than those imposed by the following claims.

What I claim is:

1. Two sets of bending and clinching dies disposed in substantial parallelism, means for actuating said sets alternately, means for moving material having parallel continuous edges step-by-step in a path normal to the paths of movement of said dies to bring longitudinally and transversely spaced parts of the material intermediate the edges thereof alternately into alinement with the dies, whereby bindings are affixed to said spaced parts of the material, and means for severing the material longitudinally between said bindings.

2. Spaced sets of bending and clinching dies, means for actuating said sets alternately, a transversely movable anvil arranged to cooperate with the bending die of each of said sets, and means for moving material transversely across the paths of movement of said dies step by step to bring longitudinally and transversely spaced parts thereof alternately into alinement with said dies.

3. Spaced sets of bending and clinching dies, means for actuating said sets alternately, a transversely movable anvil arranged to cooperate with the bending die of each of said sets, means actuated by the movement of a clincher die of each set for shifting said anvil into operative relation with the bending die of the other set, and means for moving material transversely across the paths of movement of said dies step by step to bring longitudinally and transversely spaced parts thereof alternately into alinement with said dies.

4. A die having a pocket adapted to receive adjacent groups of the yarn of a warp rope, the pocket of said die having parallel sides and a closed end and having inclined sides converging into the parallel sides, binder receiving grooves in said sides having inwardly curved end portions near the closed end of the pocket, combined with a binder having a wire core with a thread covering wound around said core, means for cutting and bending said binder into the form of a staple, and means for pushing both ends of said staple-like portion of the binder through said grooves, around the warp rope and over the curved end portions of the groove into the warp rope, whereby the severed ends of the thread covering are embedded in the warp rope.

HUGO A. KLAHRE.